(12) United States Patent
Scharland et al.

(10) Patent No.: US 11,252,015 B2
(45) Date of Patent: Feb. 15, 2022

(54) DETERMINING CAUSE OF EXCESSIVE I/O PROCESSING TIMES

(71) Applicant: EMC IP Holding Company LLC, Hopkinton, MA (US)

(72) Inventors: Michael J. Scharland, Franklin, MA (US); Jaeyoo Jung, Shrewsbury, MA (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 184 days.

(21) Appl. No.: 16/260,479

(22) Filed: Jan. 29, 2019

(65) Prior Publication Data

US 2020/0244513 A1 Jul. 30, 2020

(51) Int. Cl.
| | |
|---|---|
| *G06F 11/07* | (2006.01) |
| *H04L 12/24* | (2006.01) |
| *G06F 11/34* | (2006.01) |
| *H04L 29/08* | (2006.01) |

(52) U.S. Cl.
CPC .......... *H04L 41/064* (2013.01); *G06F 11/079* (2013.01); *G06F 11/0757* (2013.01); *G06F 11/3423* (2013.01); *G06F 11/3485* (2013.01); *H04L 41/0672* (2013.01); *H04L 41/0816* (2013.01); *H04L 67/1097* (2013.01); *G06F 2201/81* (2013.01); *G06F 2201/88* (2013.01)

(58) Field of Classification Search
CPC .... G06F 11/07; G06F 11/0757; G06F 11/079; G06F 11/34; G06F 11/3428; G06F 11/3485
See application file for complete search history.

(56) References Cited

U.S. PATENT DOCUMENTS

| | | | | |
|---|---|---|---|---|
| 7,757,017 | B2* | 7/2010 | Larson | H04L 47/125 |
| | | | | 710/29 |
| 8,122,158 | B1* | 2/2012 | Kudva | G06F 3/0613 |
| | | | | 710/7 |
| 9,747,040 | B1* | 8/2017 | Balakrishnan | G06F 3/0689 |
| 10,725,684 | B2* | 7/2020 | Balakrishnan | G06F 3/0635 |
| 2005/0066225 | A1* | 3/2005 | Rowan | G06F 11/1469 |
| | | | | 714/5.11 |
| 2008/0127199 | A1* | 5/2008 | Miki | H04L 67/1031 |
| | | | | 718/105 |
| 2008/0285457 | A1* | 11/2008 | Larson | H04L 47/10 |
| | | | | 370/237 |

(Continued)

*Primary Examiner* — Kamini B Patel
(74) *Attorney, Agent, or Firm* — Muirhead and Saturnelli, LLC

(57) ABSTRACT

Described herein are systems and techniques for determining when excessive I/O response times are not the fault of a storage port, but rather are caused by other factors or components on a storage network, for example, over-utilization of a host port. For one or more host ports and/or storage ports, a payload idle time (PIT) may be determined for each I/O operation, the PIT being the amount of time during which a storage port is waiting for a host port to be ready to send or receive data of the respective I/O operation. It may be determined whether one or more of the PITs includes an excessive idle time (EIT), where the EIT may be an amount of the PIT that is more than a predefined acceptable amount of time. The cause of the EIT may be determined.

17 Claims, 12 Drawing Sheets

(56) References Cited

U.S. PATENT DOCUMENTS

| | | | |
|---|---|---|---|
| 2009/0089462 A1* | 4/2009 | Strutt | G06F 3/0607 |
| | | | 710/16 |
| 2009/0248988 A1* | 10/2009 | Berg | G06F 12/0835 |
| | | | 711/141 |
| 2016/0092136 A1* | 3/2016 | Balakrishnan | G06F 3/0613 |
| | | | 710/38 |
| 2017/0364266 A1* | 12/2017 | Xu | G06F 3/0688 |
| 2018/0115501 A1* | 4/2018 | Reynolds | H04L 47/25 |
| 2019/0334982 A1* | 10/2019 | Mallick | H04L 67/1025 |
| 2020/0110692 A1* | 4/2020 | Senin | G06F 11/3476 |

* cited by examiner

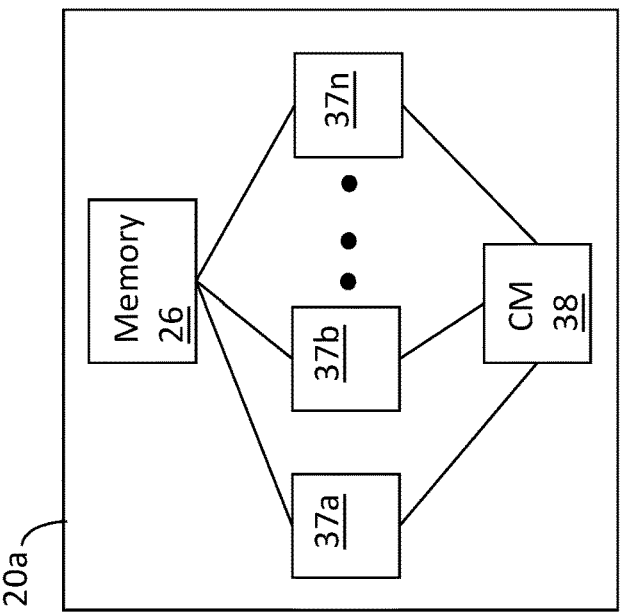
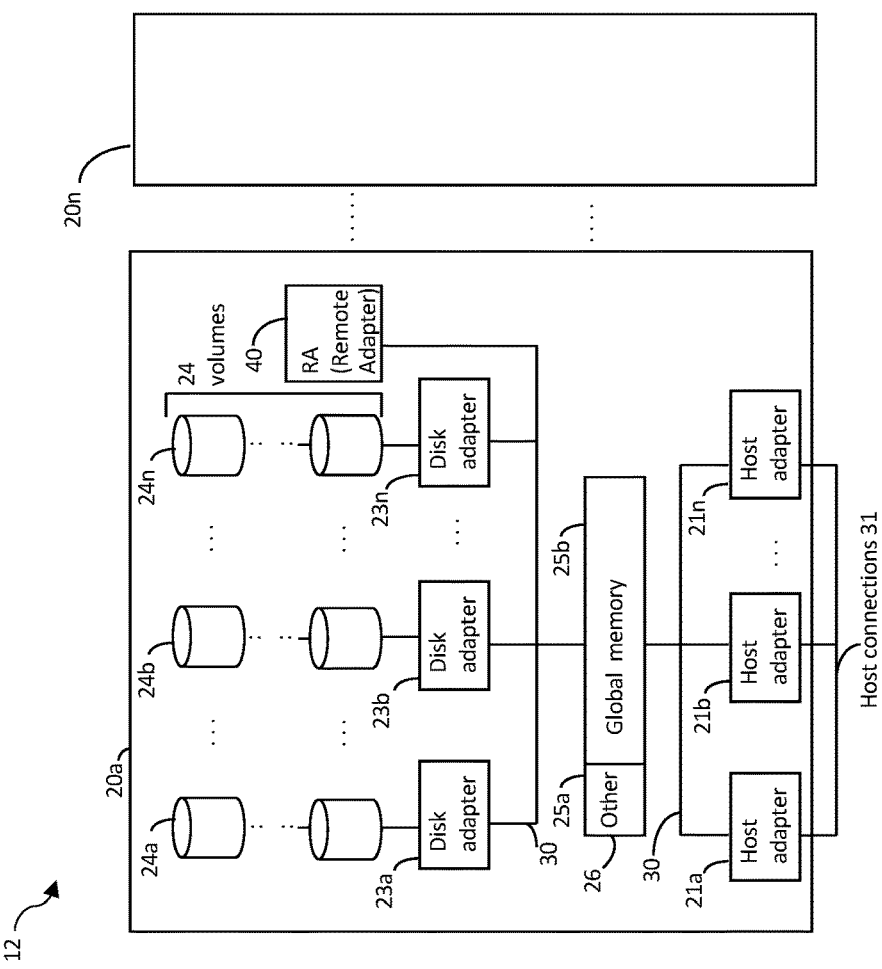
FIG. 2B
FIG. 2A

| 802 | 804 | 806 | 808 |
|---|---|---|---|
| Storage Device | Host Port | Storage System Port | Other Info |
| Dev0 | WWN12 | WWN45 | |
| Dev1 | WWN9 | WWN117 | |
| ... | | | |
| Devn | WWN77 | WWN6 | |

FIG. 8

| 902 | 904 | 906 |
|---|---|---|
| Initiator Port | Target Port | Other Info |
| WWN1 | WWN3 | |
| WWW7 | WWN8 | |
| ... | | |
| WWN9 | WWN2 | |

FIG. 9

| Txn | App | Storage Device | Storage Port | Host Port | Response Time | PIT | EIT |
|---|---|---|---|---|---|---|---|
| 1 | HR Production | Dev99 | WWN13 | WWN7 | 1.8 ms | 1.0 ms | 0.8 ms |
| 2 | Sales Backup | Dev10 | WWN19 | WWN303 | 3 ms | 0.2 ms | 0 ms |
| 3 | HR Production | Dev99 | WWN13 | WWN7 | 1.6 ms | 1.2 ms | 1.0 ms |
| 4 | Engineering Backup | Dev1010 | WWN93 | WWN7 | 5 ms | 1.3 ms | 1.1 ms |
| 5 | Marketing Production | Dev135 | WWN13 | WWN42 | 0.9 ms | 0.1 ms | 0 ms |
| ... | | | | | | | |
| n | | | | | | | |

FIG. 13

| Storage Port | Avg Response Time | Avg PIT | Avg EIT |
|---|---|---|---|
| WWN13 | 1.8 ms | 0.5 ms | 0.3 ms |
| WWN19 | 3 ms | 0.2 ms | 0 ms |
| WWN37 | 1.6 ms | 0.3 ms | 0.1 ms |
| ... | | | |
| WWNx | 4 ms | 0.1 ms | 0 ms |

FIG. 14

| Host Port | Average Response Time | Average PIT | Average EIT |
|---|---|---|---|
| WWN7 | 1.8 ms | 1.0 ms | 0.8 ms |
| WWN57 | 3 ms | 0.2 ms | 0 ms |
| WWN303 | 1.6 ms | 0.1 ms | 0 ms |
| ... | | | |
| WWNx | 5 ms | 0.2 ms | 0 ms |

FIG. 15

DETERMINING CAUSE OF EXCESSIVE I/O PROCESSING TIMES

BACKGROUND

Technical Field

This application generally relates to data storage and, in particular, I/O performance on a data storage system.

Description of Related Art

Data storage systems may include resources used by one or more host systems (i.e., "hosts"). Data storage systems and host systems may be interconnected by one or more communication connections such as in a network. These resources may include, for example, data storage devices such as those included in the data storage systems manufactured by EMC Corporation of Hopkinton Mass. ("Dell EMC"). These data storage systems may be coupled to one or more host systems, where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system. Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform I/O operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems also may be used.

A host system may host applications that utilize storage devices of the storage system. For a given application, to perform I/O operations utilizing a storage device of the storage system, one or more components of each of: a host; a switch; and a storage system may be used; i.e., communications for performing I/O operations may be transmitted through these one or more components. The one or more combinations of components of the host, switch and storage system over which I/O operations between an application and storage device can be communicated may be considered an I/O path between the application and the storage device. These I/O paths define a connectivity of the storage network.

SUMMARY OF THE INVENTION

In some embodiments, for a storage network including at least a first host system and at least a first storage system including a plurality of storage ports, the host system including at least a first host port, for each of the plurality of storage ports, for a respective I/O operation initiated from the at least first host port to the storage port, a payload idle time during performance of the respective I/O operation is determined, the payload idle time being an amount of time during which the storage port is waiting for the at least first host port to be ready to send or receive data of the respective I/O operation. From among the payload idle times, one or more excessive idle times are determined indicative of an excessive time period for a storage port to wait for a host port to be ready to send or receive data for a respective I/O operation. At least one component of the storage network is modified based on the determined one or more excessive idle times. Determining a payload idle time for a first respective I/O operation involving a first of the plurality of storage ports may include: receiving a command information unit from the at least first port indicating that the first respective I/O operation is a read operation; the storage system retrieving data from a storage device in accordance with the read operation; the first storage port indicating to the at least first host port that the retrieved data is ready to be sent to the at least first host port; and incrementing a time counter for the first respective I/O operation until an acknowledgement is received from the first host port that it is ready to receive the retrieved data. Determining a payload idle time for a first respective I/O operation involving a first of the plurality of storage ports may include: receiving a command information unit from the at least first port indicating that the first respective I/O operation is a write operation for first data; the storage system preparing to process the write operation; the first storage port communicating to the at least first host port that the first storage port is ready to receive the first data to process the write operation; and incrementing a time counter for the first respective I/O operation until an acknowledgement is received from the first host port that it is ready to transmit the first data. Determining one or more excessive idle times may include comparing one or more first payload idle time of the payload idle times to a predefined threshold corresponding to an excessive time period for a storage port to wait for a host port to be ready to send or receive data for a respective I/O operation. One or more causes of the one or more excessive idle times may be determined, where the at least one component of the storage network is modified based at least in part on the determined one or more causes. Determining the one or more causes of the one or more excessive idle times may include comparing, for at least the first host port, payload idle times and/or excessive idle times for two or more of the plurality of storage ports. Determining one or more causes may include determining from the comparing that at least a first storage port of the plurality of storage ports is not a cause of the one or more excessive idle times.

In some embodiments, for a storage network including at least a first host system and at least a first storage system including a plurality of storage ports, the host system including at least a first host port, a system includes one or more processors and memory comprising code stored thereon that, when executed, performs the above-described method.

In some embodiments, one or more computer-readable media, for example, non-transitory computer-readable media, are provided for a storage network including at least a first host system and at least a first storage system including a plurality of storage ports, the host system including at least a first host port. The computer-readable media has software stored thereon including executable code that performs the above-described method.

BRIEF DESCRIPTION OF THE DRAWINGS

Features and advantages of the present invention will become more apparent from the following detailed description of illustrative embodiments thereof taken in conjunction with the accompanying drawings in which:

FIG. 2A is a block diagram illustrating an example of a data storage system according to embodiments of the invention;

FIG. 2B is a block diagram illustrating an example of logical internal communications between directors and memory of the data storage system of FIG. 2A according to embodiments of the invention;

FIG. 6 is a block diagram illustrating an example of a plurality of logical layers of a combination of a host system and a data storage system for processing an I/O request, according to embodiments of the invention;

FIG. 8 is a block diagram illustrating an example of a data structure defining port connectivity permissions between a storage system and one or more host systems, according to embodiments of the invention;

FIG. 9 is a block diagram illustrating an example of a data structure defining port connectivity permissions for a switch, according to embodiments of the invention;

FIG. 13 is a block diagram illustrating an example of a data structure for recording payload idle time information for I/O operations, according to embodiments of the invention;

FIG. 14 is a block diagram illustrating an example of a data structure for recording payload idle time information for a host port, according to embodiments of the invention; and FIG. 15 is a block diagram illustrating an example of a data structure for recording payload idle time information for a storage port, according to embodiments of the invention.

DETAILED DESCRIPTION OF EMBODIMENTS

Figure 1:
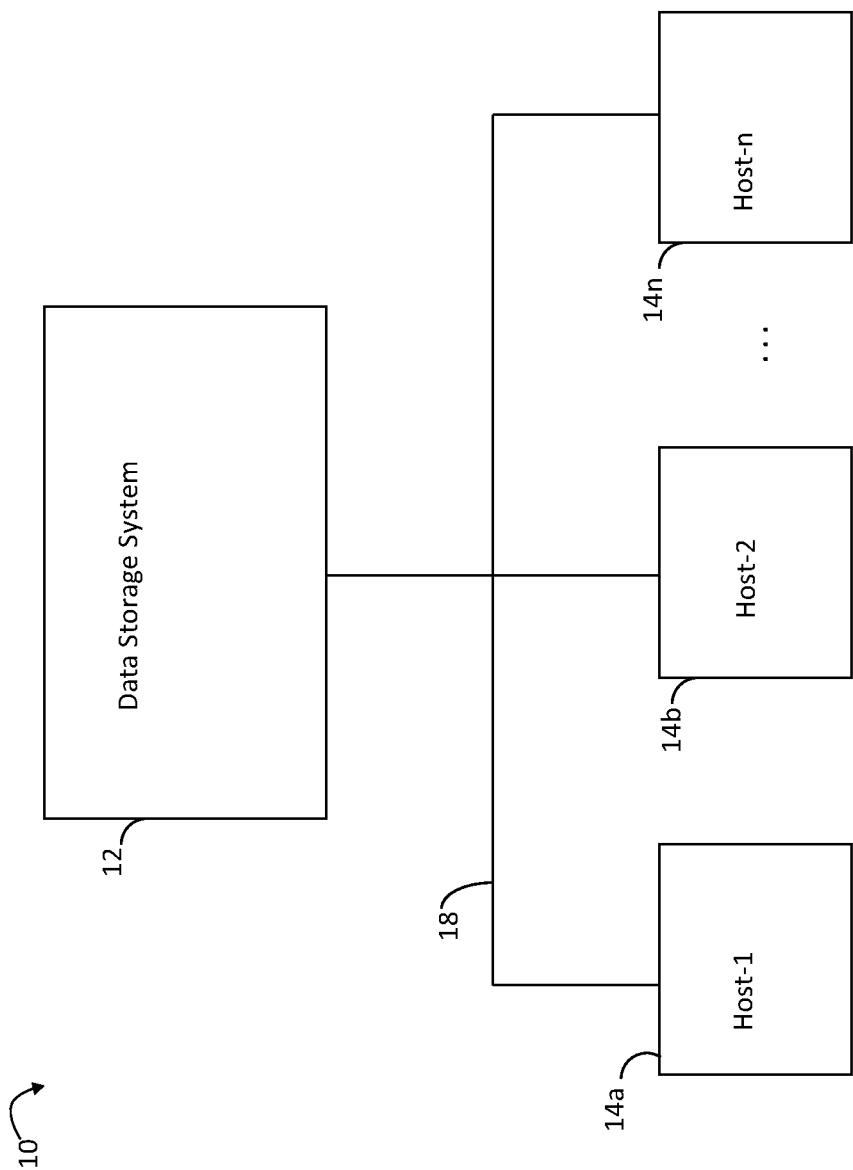
FIG. 1 is a block diagram illustrating an example of a system according to embodiments of the invention.

A common performance metric for storage systems is I/O response time (RT)—i.e., the amount of time it takes for the storage system to execute an I/O operation, for example, a read or write operation. In some cases, more specific response time metrics may be taken for types of I/O, for example, read RT and write RT. Further, specific response time metrics (as well as other I/O performance metrics) may be maintained for various logical and physical entities corresponding to a storage system, such as, for example, ports, host adapters (e.g., front-end adapters), back-end adapters (e.g., for disk drives or solid-state drives), directors, engines, storage devices (physical and/or logical), storage groups, applications, other entities, or any suitable combination of the foregoing.

In some cases, components of host systems, for example, operating systems and/or applications running thereon, do not take into account the bandwidth capacity (e.g., link speed) of a physical link (e.g., Fibre Channel cable) directly connected to a port of the host system ("host port") when managing I/O workloads. Each such physical link may fan out across one or more other physical links, including those of a switch fabric, to multiple ports of the storage system ("storage ports") over which I/O communications may be exchanged. As a result, the host system may initiate I/O operations over a host port at a greater bit rate than the bit rate capacity of the physical link of the host port, which may be referred to herein as port over-utilization. Port over-utilization may result in the host port having multiple outstanding I/O operations (read and/or write operations) with one or more storage ports. An I/O operation initiated from a host port may be considered "outstanding" upon a command information unit (CIU), for example, a SCSI command descriptor block (CDB), being transmitted from the host port (e.g., the initiator per SCSI technology standards) to the storage port (e.g., the target per SCSI technology standards), until the I/O operation is completed—i.e., the data is stored on a storage device (for a write operation) or retrieved and sent to the host port (for a read operation). While the CIU of an outstanding I/O operation may have been transmitted, the payload (including the data) of the I/O operation may be queued on the host (e.g., in the case of a write operation) awaiting transmission, or the payload may be queued on the storage array (e.g., in the case of a read operation), awaiting an indication (e.g., ACK) from the host port that the host port is ready to receive the retrieved data.

Port over-utilization may result in longer measured response times for I/O operations. In such cases, the longer-than-usual (e.g., excessive) response times may be improperly attributed to the storage system, even though over-utilization of a host port is the root cause. Such improper attribution may lead to a wrong remediation being taken, which may not only fail to shorten response times, but lead to a further increase in response times. For example, in response to excessive response times, additional storage ports may be configured (e.g., "zoned") for I/O communication with a host port and one or more applications reconfigured to use the additional storage ports, but the same host port. However, this may lead to even more I/O traffic on an already over-utilized host port, causing even longer response times.

Described herein are systems and techniques for determining when excessive I/O response times are not the fault of a storage port, but rather are caused by other factors or components on a storage network, for example, over-utilization of a host port. In some embodiments, for one or more host ports and/or storage ports, a payload idle time (PIT) may be determined for each I/O operation, the PIT being the amount of time during which a storage port is waiting for a host port to be ready to send or receive data of the respective I/O operation. From among the determined PITs, it may be determined whether one or more of the PITs includes an excessive idle time (EIT), where the EIT may be an amount of the PIT that is more than a predefined acceptable amount of time. For example, a threshold may be established indicative of an acceptable PIT, e.g., an expected PIT under normal circumstances without I/O congestion between a storage port and a host port. The EIT may equal the measured PIT minus this threshold value if the PIT is greater than the threshold, and may equal zero (0) if PIT is the same or less than the threshold.

By analyzing PITs, EITs, and information derived or related thereto for multiple host ports, storage ports and/or other storage system components (e.g., average PITs and/or average EITs for one or more storage ports and/or host ports), one or more causes of excessive RTs may be determined or at least surmised, while other potential causes of the excessive RTs may be ruled out. For example, a storage port exhibiting excessive RTs for I/O operations with a first host port may exhibit lower RTs values for I/O operations with other host ports, and analysis of EIT information may show a consistent pattern of excessive EIT for the first host port. It may be determined from such analysis that the storage port is not a cause of excessive RT times, but that the host port or something between the host port and the storage port (e.g., a switch fabric) is a cause of the excessive RT times. Further, if it may be determined that: other host ports and storage ports that use the switch fabric or other components between a host and storage system are not exhibiting excessive RTs; zoning has been implemented properly for a switch fabric; and workloads are relatively balanced across the switch fabric. In such a case, it may be determined that there is a problem with the first host port, which may be a problem with a host bus adapter (HBA) to which the host port belongs or a problem with another component on the host affecting I/O communications on the first host port. For example, it may be determined that the physical link of the first host port is over-utilized.

Based on the determined cause of an EIT, one or more remediations may be undertaken, including, for example, relocating a host application to another host, reconfiguring a host (e.g., using a multi-path driver) and/or switch (e.g., using a zoning table) to use one or more different host ports for one or more applications running on the host; adding more host ports (e.g., adding one or more HBAs) to the host; re-zoning a switch; replacing host ports (e.g., replacing HBAs), switches or switch components with higher-performance replacements; other remediations, or any suitable combination of the foregoing. One or more of such remediations may reduce utilization of an over-utilized host port link. It should be appreciated that analysis of PIT and/or EIT information may reveal that excessive RTs are caused by one or more components of a storage system, including a storage port, front-end adapter, director, engine core, back-end adapter, storage device, other component of the storage system, any suitable combination of the foregoing, including a configuration of any of the foregoing (e.g., masking tables), such that remediation may include replacing and/or reconfiguring one or more of the foregoing components or adding components to improve I/O performance.

In some embodiments of the invention, analysis of PITs and/or EITs, and/or remedial action in response to same, is performed in response to determining excessive RTs, whereas, in some embodiments, analysis of PITs and/or EITs, and/or remedial action in response to same, is performed irrespective of whether an excessive RT has been determined. It should be appreciated that one or more response time objectives (RTOs) may be associated with various entities of a storage network (e.g., <1 ms, no less than 3 ms, etc.). For example, RTOs may be associated with storage devices, storage groups of storage devices and/or applications running on a host. The storage system may be configured with logic to attempt to achieve RTOs, which may result in I/O operations being intentionally accelerated and/or delayed in order to satisfy RTOs. Thus, when determining whether an RT for an I/O operation is excessive or an average RT for a storage network entity (e.g., storage network component or application) is excessive, RTOs may be taken into consideration. For example, measured RTs may be compared to one or more RTOs corresponding to I/O operations.

Illustrative embodiments of the invention will now be described in more detail in relation to the figures.

Referring now to FIG. 1, shown is an example of an embodiment of a system 10 according to some embodiments of the invention. The system 10 includes a data storage system 12 connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage system 12, and also may communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be appreciated that the particulars of the hardware and software included in each of the components that may be included in the data storage system 12 are described herein in more detail, and may vary with each particular embodiment. Each of the host computers 14a-14n and data storage system may all be located at the same physical site, or, alternatively, also may be located in different physical locations. Communication media that may be used to provide the different types of connections between the host computer systems and the data storage system of the system 10 may use a variety of different communication protocols such as, for example, SCSI, ESCON, Fibre Channel, iSCSI, FCoE, GIGE (Gigabit Ethernet), NVMeoF (NVMe over Fabric) and the like. Some or all of the connections by which the hosts and data storage system 12 may be connected to the communication medium 18 may pass through other communication devices, such as switching equipment, a phone line, a repeater, a multiplexer or even a satellite.

Each of the host computer systems may perform different types of data operations in accordance with different tasks and applications executing on the hosts. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12.

Referring now to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be inter-connected (not shown). Additionally, the data storage systems also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example, as described in more detail in following paragraphs, reference is made to the more detailed view of element 20a. It should be noted that a similar more detailed description also may apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems.

Each of the data storage systems, such as 20a, may include a plurality of physical data storage devices (e.g., physical non-volatile storage devices), such as disk devices or volumes, for example, in an arrangement 24 consisting of n rows of disks or volumes 24a-24n. In this arrangement, each row of disks or volumes may be connected to a disk adapter ("DA") or director responsible for the backend management of operations to and from a portion of the disks or volumes 24. In the system 20a, a single DA, such as 23a, may be responsible for the management of a row of disks or volumes, such as row 24a. System 20a also may include a fabric that enables any of disk adapters 23a-23n to access any of disks or volumes 24-24N, in which one or more technologies and/or protocols (e.g., NVMe or NVMe-oF) may be employed to communicate and transfer data between the DAs and the disks or volumes. The system 20a also may include one or more host adapters ("HAs") or directors 21a-21n. Each of these HAs may be used to manage communications and data operations between one or more host systems and the global memory. In an embodiment, the HA may be a Fibre Channel Adapter or other type of adapter which facilitates host communication.

Also shown in the storage system 20a is an RA or remote adapter 40. The RA may be hardware including a processor used to facilitate communication between data storage systems, such as between two of the same or different types of data storage systems.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

It should be generally noted that the elements 24a-24n denoting physical storage devices may be any suitable physical storage device such as a rotating disk drive, flash-based storage, and the like. The particular data storage system as described in this embodiment, or a particular physical storage device thereof, such as a rotating disk or solid-state storage device (SSD; e.g., a flash-based storage device), should not be construed as a limitation. Other types of commercially available data storage systems, as well as processors and hardware controlling access to these particular devices, also may be included in an embodiment.

In at least one embodiment, write data received at the data storage system from a host or other client may be initially written to cache memory (e.g., such as may be included in the component designated as 25b) and marked as write pending. Once written to cache, the host may be notified that the write operation has completed. At a later point time, the write data may be de-staged from cache to the physical storage device, such as by a DA.

Host systems provide data and access control information through channels to the storage systems, and the storage systems also may provide data to the host systems also through the channels. The host systems do not address the disk drives of the storage systems directly, but rather access to data may be provided to one or more host systems from what the host systems view as a plurality of LUNs. The LUNs may or may not correspond to the actual disk drives. For example, one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and LUN(s) residing thereon.

Referring to FIG. 2B, shown is a representation of the logical internal communications between the directors and memory included in a data storage system according to some embodiments of the invention. Included in FIG. 2B is a plurality of directors 37a-37n coupled to the memory 26. Each of the directors 37a-37n represents one of the HAs, RAs, or DAs that may be included in a data storage system. In an embodiment disclosed herein, there may be up to sixteen directors coupled to the memory 26. Other embodiments may use a higher or lower maximum number of directors that may vary. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

In an embodiment in accordance with techniques herein, the data storage system as described may be characterized as having one or more logical mapping layers in which a logical device of the data storage system is exposed to the host whereby the logical device is mapped by such mapping layers of the data storage system to one or more physical devices. Additionally, the host also may have one or more additional mapping layers so that, for example, a host side logical device or volume is mapped to one or more data storage system logical devices as presented to the host. The unqualified term "storage device" as used herein means a logical device or physical storage device.

Storage system 12 or one or more components thereof described in relation to FIGS. 1-2B may be implemented using one or more Symmetrix®, VMAX® or VMAX3® systems (hereinafter referred to generally as VMAX storage systems) made available from Dell EMC.

Figure 3:
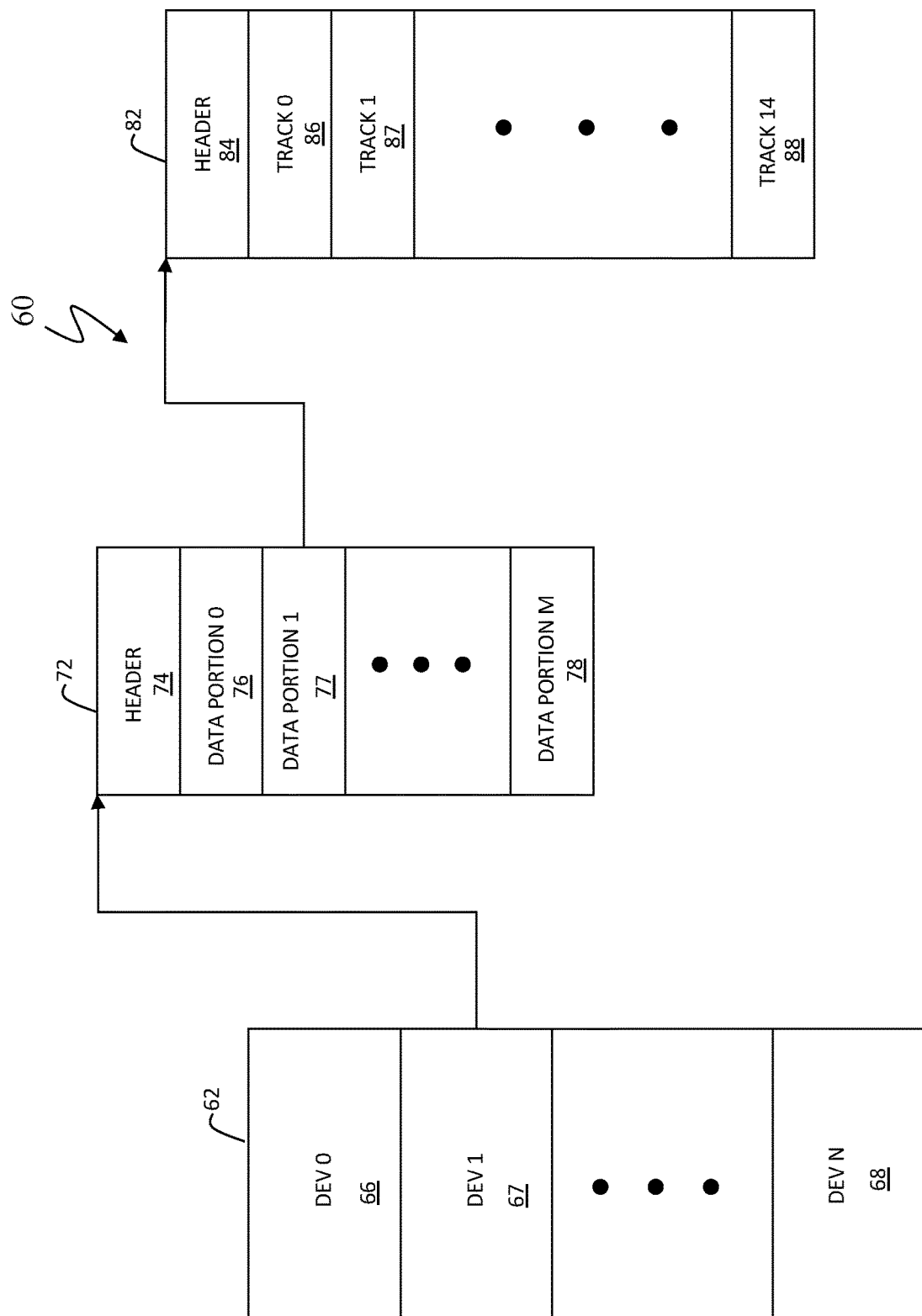
FIG. 3 is a block diagram illustrating an example of tables for keeping track of logical information associated with storage devices, according to embodiments of the invention.

FIG. 3 is a block diagram illustrating an example of tables 60 for keeping track of logical information associated with storage devices, according to embodiments of the invention. A first table 62 corresponds to all of the logical devices used by the storage system 24 or by an element of a storage system, such as an HA and/or a DA. The table 62 may include a plurality of logical device entries 66-68 that correspond to the logical devices used by the data storage system 24. The entries in the table 62 may include descriptions for standard logical devices, virtual devices, log devices, thin devices, and other types of logical devices.

Each of the entries 66-68 of the table 62 may correspond to another table that contains information for each of the logical devices. For example, the entry 67 may correspond to a table 72. The table 72 may include a header that contains overhead information. The table 72 also may include entries 76-78 for separate contiguous data portions of the logical device (e.g., a cylinder and/or a group of tracks). In an embodiment disclosed herein, a logical device may contain any number of data portions depending upon how the logical device is initialized. However, in other embodiments, a logical device may contain a fixed number of data portions.

Each of the data portion entries 76-78 may correspond to a track table. For example, the entry 77 may correspond to a track table 82 that includes a header 84 having overhead information. The track table 82 also includes entries 86-88 for each of the tracks. In an embodiment disclosed herein, there are fifteen tracks for every contiguous data portion. However, for other embodiments, it may be possible to have different numbers of tracks for each of the data portions or even a variable number of tracks for each data portion. For standard logical devices, the information in each of the entries 86-88 may include a pointer (either direct or indirect) to a physical address on one of the PDs 36a-36c of the storage system 24 (or a remote storage system if the system is so configured). Thus, the track table 82 may be used to map logical addresses of the logical device corresponding to the tables 62, 72, 82 to physical addresses on the PDs 36a-36c of the storage system e 24.

The tables 62, 72, 82 of FIG. 3 may be stored in the global memory 26 of the storage system 24 during operation thereof and may otherwise be stored in non-volatile memory (i.e., with the corresponding physical device). In addition, tables corresponding to logical devices accessed by a particular host may be stored in local memory of the corresponding one of the HA's 28a-28c. In addition, the RA's 32a-32c and/or the DA's 38a-38c may also use and locally store portions of the tables 62, 72, 82.

Figure 4:
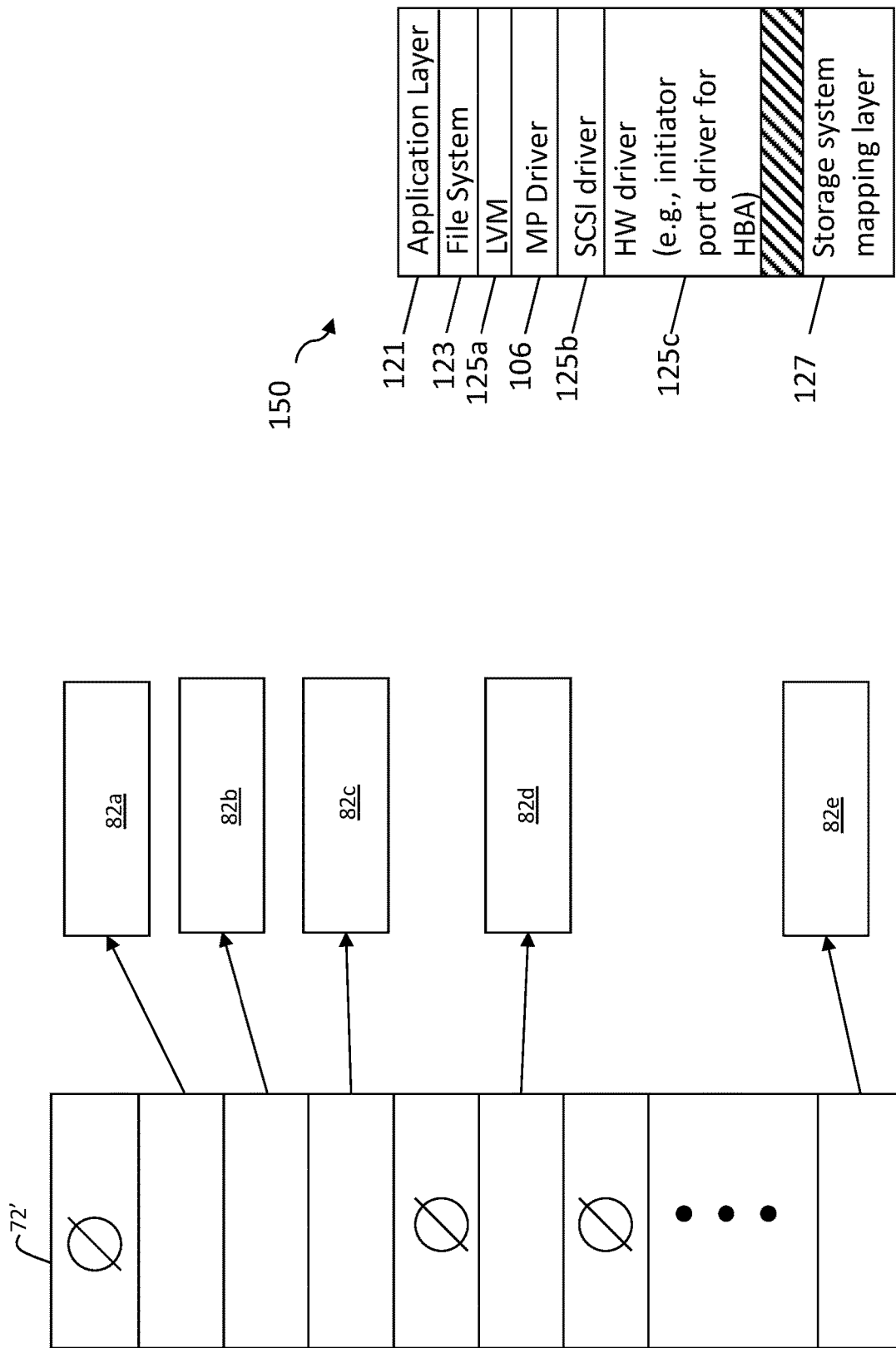
FIG. 4 is a diagram illustrating an example of a table used for a thin logical device, according to embodiments of the invention.

FIG. 4 is a diagram illustrating an example of a table 72' used for a thin logical device, according to embodiments of the invention, which may include null pointers as well as entries similar to entries for the table 72, discussed above, that point to a plurality of track tables 82a-82e. The thin logical device may be allocated by the system to show a particular storage capacity while having a smaller amount of physical storage that is actually allocated. When a thin logical device is initialized, all (or at least most) of the entries in the table 72' may be set to null. Physical data may be allocated for particular sections as data is written to the particular data portion. If no data is written to a data portion, the corresponding entry in the table 72' for the data portion maintains the null pointer that was written at initialization.

Figure 5:
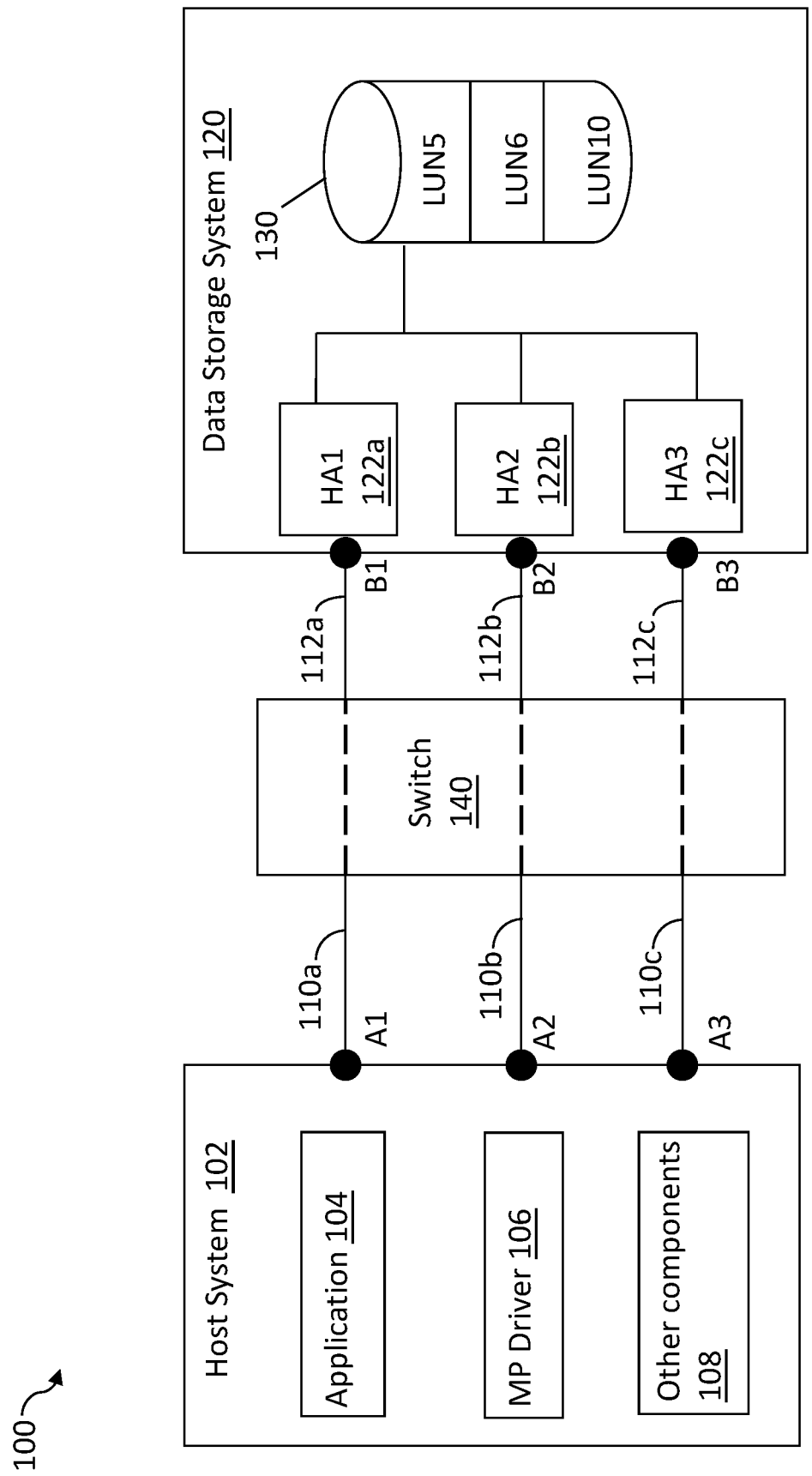
FIG. 5 is a block diagram illustrating an example of a system including a host system communicatively coupled to a data storage system via multiple I/O paths, according to embodiments of the invention.

FIG. 5 is a block diagram illustrating an example of a system 100 including a host system 102 communicatively coupled to a data storage system 120 via multiple I/O paths, according to embodiments of the invention. Other embodiments of system including a host system communicatively coupled to a data storage system via multiple I/O paths, for example, variations of system 100, are possible and are intended to fall within the scope of the invention. The system 100 may be implemented using one or more components of the system 10, for example, one or more storage systems 12 and/or one or more hosts 14a-14n, or variation thereof.

The system 100 may include a host system 102, switch 140 and data storage system 120. The host system 102 and data storage system 120 may communicate over one or more I/O paths through the switch 140. Elements 110a-110c denote connections between the host system 102 and switch 140. Element 112a-112c denote connections between the data storage system 120 and the switch 140. Element 130 may represent a physical storage device of the data storage system 120, such as a rotating disk drive, flash-based or other solid state storage device, or the like, where the physical storage device 130 may be configured to include three LUNs-LUN5, LUN6 and LUN10. It should be noted that the system 100 includes only a single host system 102, single physical device 130 with 3 LUNs, a single data storage system 120, and a single switch for purposes of simplicity to illustrate the techniques herein. For example, each of the LUNs may be configured to have storage provisioned from multiple different physical devices rather than a single physical device, and multiple host systems having multiple applications executing thereon may communicate with the data storage system.

It should be appreciated that the descriptions provided in the following paragraphs may refer to particular examples using the switch 140 having a switching fabric for simplicity of illustration. Element 140 may be a single switch having a switching fabric, a multi-switch having a multi-switch fabric and the like. Thus, element 140 may more generally denote a network having its own connectivity fabric or network fabric where the network may include one or more components providing the connectivity between the host system 102 and data storage system 120.

The host system 102 may be implemented as a server, and may include an application 104, a multi-path (MP) driver 106 and other components 108 such as, for example, one or more other device drivers and other code. An I/O request (specifying an I/O operation) from the application 104 may be communicated to the data storage system 120 using the MP driver 106 and one or more other components 108. The application 104 may be a database or other application which issues data operations, such as I/O operations, to the data storage system 120. Each of the I/O operations may be directed to a target device, such as one of the LUNs of device 130, configured to be accessible to the host system 102 over multiple I/O paths. As such, each of the I/O operations may be forwarded from the application 104 to the data storage system 120 over one of the possible multiple I/O paths. The MP driver 106 may include functionality to perform any one or more different types of processing such as related to encryption, multi-pathing, mirroring, migration, and the like. For example, the MP driver 106 may include multi-pathing functionality for management and use of multiple I/O paths. For example, the MP driver 106 may perform I/O path selection to select one of the possible multiple I/O paths based on one or more criteria such as load balancing to distribute I/O requests for the target device across available active I/O paths. Load balancing may be performed to provide for better resource utilization and increased performance of the host system, data storage system, and network or other connection infrastructure. The MP driver 106 may be included in a commercially available product such as, for example, Dell EMC PowerPath® software made available by Dell EMC. Other components 108 of the host system 102 may include one or more other layers of software used in connection with communicating the I/O operation from the host system to the data storage system 120 such as, for example, Fibre Channel (FC) or SCSI drivers, a logical volume manager (LVM), or the like. The other components 108 may include software or other components used when sending an I/O operation from the application 104 to the data storage system 120, where such components may include those invoked in a call stack above and/or below the MP driver 106. For example, application 104 may issue an I/O operation which is communicated via a call stack including an LVM, the MP driver 106, and an FC or SCSI driver, e.g., as described elsewhere herein in more detail.

The data storage system 120 may include one or more physical data storage devices, such as device 130, where each such physical device may be configured to store data of one or more LUNs. Each of the LUNs having data stored on the device 130 may be configured to be accessible to the host system 102 through one or more I/O paths. For example, all LUNs of 130 may be accessible using ports of the three front-end directors or interfaces 122a-122c, also denoted respectively HA1, HA2 and HA3. The multiple I/O paths allow the application I/Os to be routed over multiple I/O paths and, more generally, allow the LUNs of device 130 to be accessed over multiple I/O paths. In the event that there is a component failure in one of the multiple I/O paths, I/O requests from applications can be routed over other alternate I/O paths unaffected by the component failure. The MP driver 106 may be configured to perform load balancing in connection with I/O path selection, as well as other processing. The MP driver 106 may be aware of, and may monitor, all I/O paths between the host system and the LUNs of the device 130 in order to determine which of the multiple I/O paths are active or available at a point in time, which of the multiple I/O paths are unavailable for communications, and to use such information to select an I/O path for host system-data storage system communications.

In the example of the system 100, each of the LUNs of the device 130 may be configured to be accessible through three I/O paths. Each I/O path may be represented by two path endpoints having a first endpoint on the host system 102 and a second endpoint on the data storage system 120. The first endpoint may correspond to a port of a host system component, such as a host bus adapter (HBA) of the host system 102, and the second endpoint may correspond to a port of a data storage system component, such as a port of an HA of the data storage system 120. In the example of the system 100, elements A1, A2 and A3 each denote a port of a host system 102 (e.g., a port of an HBA), and elements B1, B2 and B3 each denote a port of an HA of the data storage system 120. Each of the LUNs of the device 130 may be accessible over three I/O paths—a first I/O path represented by A1-B1, a second I/O path represented by A2-B2 and a third I/O path represented by A3-B3.

FIG. 6 is a block diagram illustrating an example of a plurality of logical layers 150 of a combination of a host system (e.g., the host system 102 of FIG. 5) and a data storage system (e.g., the data storage system 120) for processing an I/O request, according to embodiments of the invention. Other embodiments of a plurality of logical layers of a combination of a host system and a data storage system for processing an I/O request, for example, variations of logical layers 150, are possible and are intended to fall within the scope of the invention. FIG. 6 provides further detail regarding various software layers that may be used in connection with the MP driver 106 of FIG. 5. The various software layers of 150 may generally form layers included in the runtime I/O stack, such as when an I/O request is issued by an application on a host system to a data storage system. The system includes an application layer 121 which includes application programs executing on the host system computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host system may perceive as corresponding to a physical device address (e.g., the address of one of the disk drives) within the storage system. Below the LVM layer 125a may be the MP (multi-path) driver 106 which handles processing of the I/O received from layer 125a. The MP driver 106 may include a base driver and one or more driver extension modules. The MP driver 106 may be implemented using a commercially available product such as Dell EMC PowerPath software.

Functionality for performing multi-pathing operations, such as may be performed by Dell EMC PowerPath software, may be included in one of the driver extension modules such as a multi-path extension module. As described above, the MP driver may perform processing in connection with multiple I/O path management and selecting one of a plurality of possible I/O paths for use in connection with processing I/O operations and communicating with the data storage system, such as data storage system 120 of FIG. 5. More generally, one or more layers between the application layer 121 and the MP driver 106, for example, the file system 123, may provide for mapping a LUN (such as used in connection with block-based storage), presented by the data storage system to the host system, to another logical data storage entity, such as a file, that may be used by the application layer 121. Below the MP driver 106 may be the SCSI driver 125*b* and a hardware (HW) driver 125*c*. The SCSI driver 125*b* may handle processing of a received I/O request from the MP driver 106 such as related to forming a request in accordance with one or more SCSI standards. The driver 125*c* may be a hardware driver that facilitates communication with hardware on the host system. The driver 125*c* may be, for example, a driver for an HBA of the host system which sends commands or requests to the data storage system and also receives responses and other communications from the data storage system. It should be appreciated that, in some embodiments, the ordering of the MP driver 106 and SCSI driver 125*b* may be reversed. That is, in some cases, the MP driver 106 sits below the SCSI driver 126*b*.

In some embodiments, layers 121-125*c* are implemented on a host (e.g., the host system 102) coupled to a data storage system (e.g., the data storage system 120) that is an intelligent data storage system having its own mapping layer 127 such that the LUN known or exposed to the host system may not directly correspond to a physical device such as a disk drive. In such embodiments, the LUN specified by the host system in the I/O operation may be further mapped by the data storage system using its mapping layer 127. For example, a LUN specified by the host system may be mapped by the data storage system to one or more physical drives, and multiple LUNs may be located on a same physical device, multiple physical drives, and the like.

The MP driver 106, as well as other components illustrated in FIG. 6, may execute in a kernel mode or another privileged execution mode. In some embodiments using a Unix-based OS, the MP driver 106 may be executed in kernel mode, whereas an application such as represented by application layer 121 may typically execute in user mode, or more generally, a non-privileged execution mode. It should be appreciated that embodiments of the invention may be implemented using any of a variety of different suitable OSs including a Unix-based OS, a Linux-based system, any one of the Microsoft Windows® OSs, or other OSs. Additionally, the host system may provide a virtualized environment and may execute, for example, VMware ESX® or VMware ESXi™ software providing bare-metal embedded hypervisors.

In operation, an application executing at application layer 121 may issue one or more I/O requests specifying I/O operations (e.g., read and write operations) to logical volumes (implemented by the LVM 125*a*) or files (implemented using the file system 123), whereby such I/O requests may be mapped to I/O communications (specifying the I/O operation) directed to LUNs of the data storage system. Such I/O operations from the application layer 121 may be directed to the MP driver 106 after passing through any intervening layers such as, for example, the layers 123 and 125*a*. Communications between an initiator port of the host system and a target port of a data storage system (e.g., target port of an HA) may include those related to I/O operations and other non-I/O commands such as related to host system control operations. I/O operations may include, for example, read and write operations with respect to data stored on a LUN.

In connection with the SCSI standard, an I/O path may be defined between an initiator port of the host system and a target port of the data storage system. An I/O request may be sent from the host system (e.g., from a component thereof such as an HBA), which may be referred to as an initiator, originator or source with respect to the foregoing I/O path. The host system, as the initiator, sends I/O requests along the I/O path to a data storage system (e.g., a particular component thereof such as an HA having a port with a network address), which may be referred to as a target, destination, receiver, or responder. Each physical connection of an I/O path may be between a first endpoint which is a port of the host system (e.g., such as an HBA having ports such as denoted as A1-A3 of FIG. 5) and a second endpoint which is a port of an HA (e.g., such as B1-B3 of FIG. 5) in the data storage system. Through each such I/O path, one or more LUNs may be visible or exposed to the host system initiator through the target port of the data storage system.

Figure 7:
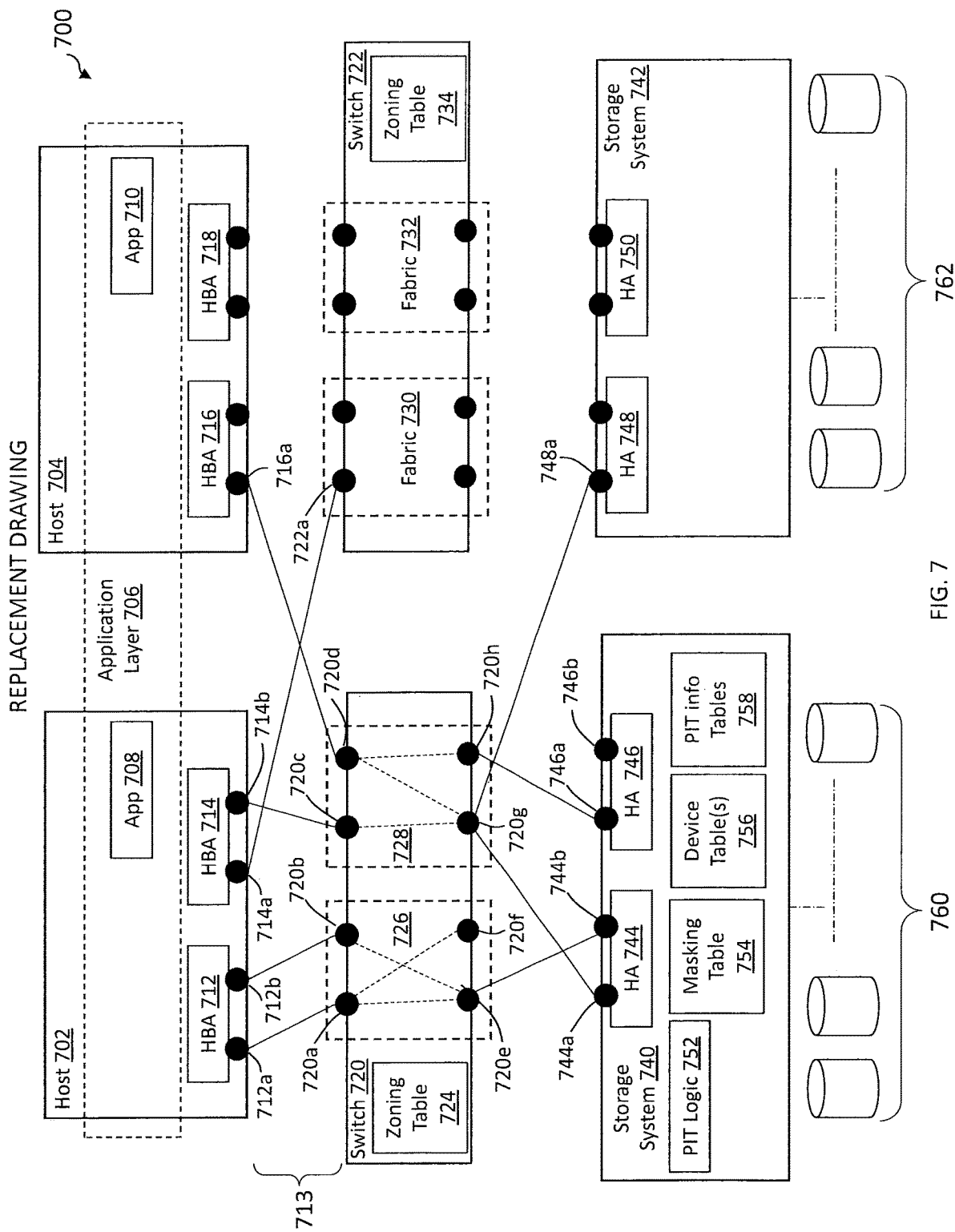
FIG. 7 is a block diagram illustrating an example of a storage network, according to embodiments of the invention.
Figure 7A:
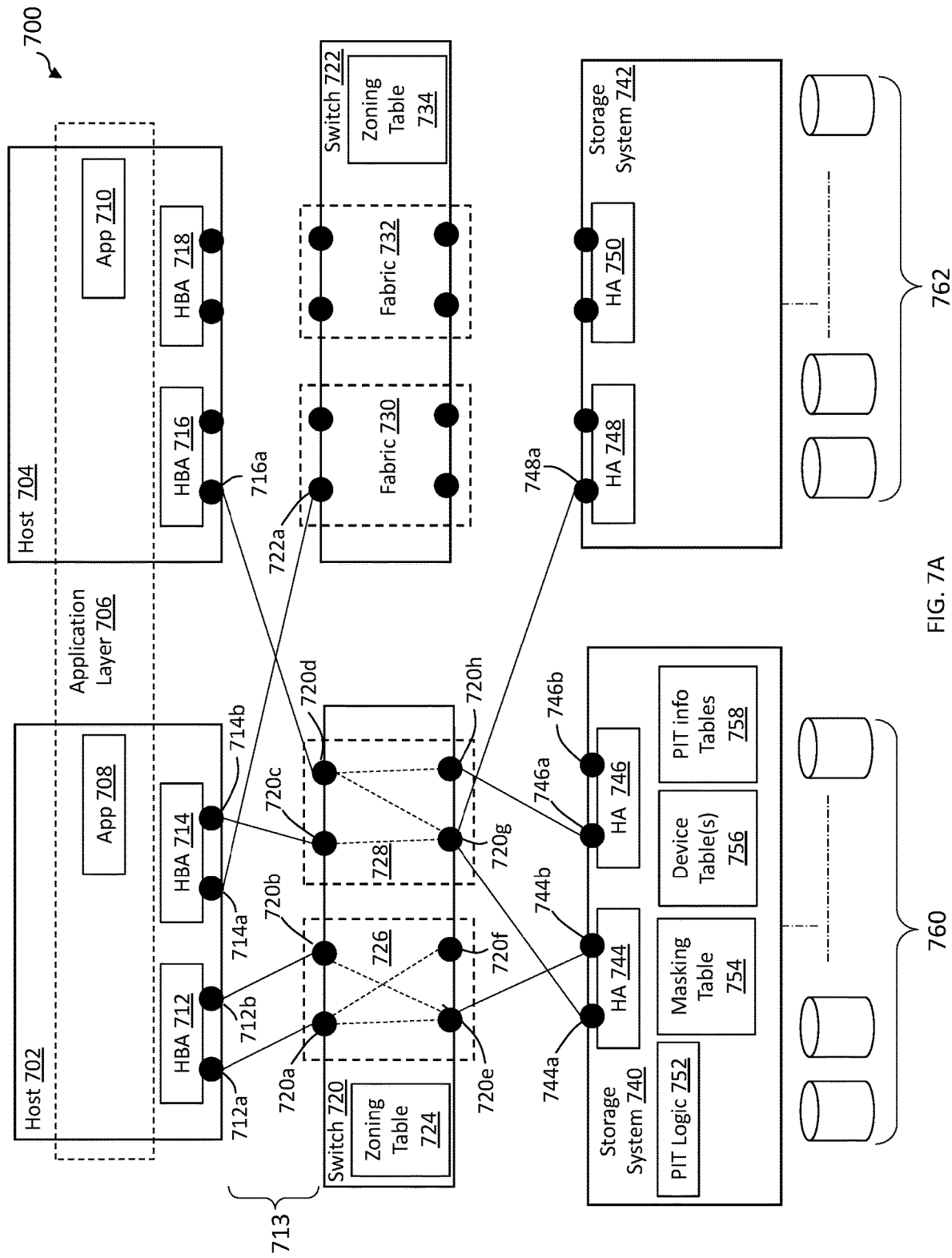

FIG. 7 is a block diagram illustrating an example of a storage network 700, according to embodiments of the invention. Other embodiments of a storage network, for example, variations of storage network 700, are possible and are intended to fall within the scope of the invention. System 700 may include any of: hosts 702 and 704; switches 720 and 722; storage systems 740 and 742; physical storage devices 760 and 762; other components; or any suitable combination of the foregoing. It should be appreciated that, while only two hosts are shown, system 700 may have significantly many more hosts, including tens, hundreds or even thousands more. Hosts 702 and 704 each may be physical host systems or virtual systems as part of a virtualized environment, and may be part of a host cluster and/or distributed across multiple physical devices and/or part of a cloud environment. Each of hosts 702 and 704 may be a host system 102 described in relation to FIG. 5 or include any of the components thereof described herein. Application layer 706 may represents the collective applications layers of the software stacks of hosts 702 and 704, each of which may be an application layer 121 as described in relation to FIG. 6.

Host 702 may include any of: a portion of the application layer at 706; application 708; HBAs 712 and 714; and host ports 712*a*, 712*b*, 714*a* and 714*b*. The portion of application layer 706 running on host 702 may include application 708 and one or more other applications. HBA 712 may include host ports 712*a* and 712*b*, and HBA 714 may include host ports 714*a* and 714*b*. HBAs 712 and 714 each may be separate discrete logical or physical components of host 702, and host 702 may include more than the two HBAs illustrated. Each of the host ports 712*a*, 712*b*, 714*a* and 714*b* may be connected to an SHP (i.e., fabric port) of switch 720 or 722 by physical connections 713. Each such physical connection may be a cable and, in some embodiments, there is only allowed one physical connection between each host port and fabric port (e.g., in accordance with a technology standard (e.g., FC)) as illustrated in FIG. 7. That is, in some embodiments, each fabric port is dedicated to one host port. Host 704 may include any of: a portion of the application layer at 706; application 710; HBAs 716 and 718; and multiple host ports including host port 716*a* of HBA 716.

Switch 720 may include any of: zoning table 724, fabrics 726 and 728; ports 720*a-h*; other components; or any suitable combination of the foregoing. Zoning table 724 may be a data structure that defines which host ports (as defined by a unique identifier such as a WWN), e.g., corresponding to host ports 712*a*, 712*b*, 714*a*, 714*b* and 7116*a*, are allowed to communicate with which storage system (e.g., HA) ports, for example, 744*a*, 744*b*, 746*a*, 746*b* and 748*a*. The switch 720 may use the information in the zoning table 724 to determine the internal switch connections between fabric ports and SSPs to implement the defined zones, as illustrated by the dashed lines within switch 720 in FIG. 7. Zoning table 724 or another data structure on switch 720 may define one or more fabrics, including fabrics 726 and 728, for example, by specifying the switch ports that are members of the fabrics, as described in more detail elsewhere herein. For example, a data structure on switch 720 or elsewhere may define that fabric 726 includes ports 720*a*, 720*b*, 720*e* and 720*f*. Switch 722 may include any of: zoning table 734, fabrics 730 and 732; several ports including port 722*a*; other components; or any suitable combination of the foregoing. Each of switches 720 and 722 may be a switch 140 described in relation to FIG. 5 or include any of the components thereof described herein. In some embodiments, one or both of switches 720 and 722 may be a Dell EMC Connectrix™ switch or director made available by Dell EMC.

Storage system 740 may include any of: PIT logic 752; masking table 754; device table(s) 756; PIT information tables 758; HAs 744 and 746; storage ports 744*a*, 744*b*, 746*a* and 746*b*; other components; and any suitable combination of the foregoing.

Device table(s) 756 may define properties of storage devices of the storage system 740, including logical devices (which may include thin devices) corresponding to physical storage devices 760, as described in more detail elsewhere herein. Masking table 754 may define which host ports (e.g., 712*a*, 712*b*, 714*a*, 714*b*, 716*a*) are permitted to communicate with which storage devices over which storage ports (e.g., 744*a*, 744*b* 746*a*, 746*b*). PIT Information tables 758 may include one or more data structures including PIT information related to one or more of storage ports 744*a*, 744*b*, 746*a* and/or 746*b* and/or host ports 712*a*, 712*b*, 714*a*, 714*b* and/or 716*a* as is described in more detail elsewhere herein. PIT logic 752 may be configured with logic (software, hardware, firmware or a combination thereof) to perform one or processes in accordance with determining causes of excessive RT, PIT and/or EIT, for example, one or more of the methods relating thereto described herein. Storage system 742 may include any of the same or similar components as storage system 740, including HA 748 and storage port 748*a* thereof. In some embodiments, storage systems 740 and/or 742 may be a storage system 20*a* and/or 120 described in relation to FIGS. 2A and 5, respectively, or include one more components and/or functionality thereof.

FIG. 8 is a block diagram illustrating an example of a data structure 800 defining port connectivity permissions between a storage system and one or more host systems, according to embodiments of the invention. Other embodiments of a data structure defining port connectivity permissions between a storage system and one or more host systems, for example, variations of data structure 800, are possible and are intended to fall within the scope of the invention. In some embodiments, data structure 800 may be a masking table (e.g., masking table 754). Data structure 800 may include a plurality of entries 810, each entry representing a storage device identified in column 802 and specifying a host port (e.g., by WWN) in column 804 with which the identified storage device is allowed to communicate I/O over the storage port identified in column 806. Other information, for example, the host and/or the HBA associated with the host port and/or the HA associated with the storage port may be specified in column 808. A data structure other than a table, for example, a linked list and/or object-oriented data structure, may be used to record the same information.

FIG. 9 is a block diagram illustrating an example of a data structure 900 defining port connectivity permissions for a switch, according to embodiments of the invention. Other embodiments of a data structure defining port connectivity permissions for a switch, for example, variations of data structure 900, are possible and are intended to fall within the scope of the invention. Data structure 900 may be a zoning table, and may include a plurality of entries 910, each entry representing an initiator port (e.g., a host port) in column 902 and a target port (e.g., a storage port) in column 904 with which the initiator port may communicate over a fabric. Other information, for example, host, HBA, HA, fabric name, etc. may be specified in column 906. A data structure other than a table, for example, a linked list and/or object-oriented data structure, may be used to record the same information.

Figure 10:
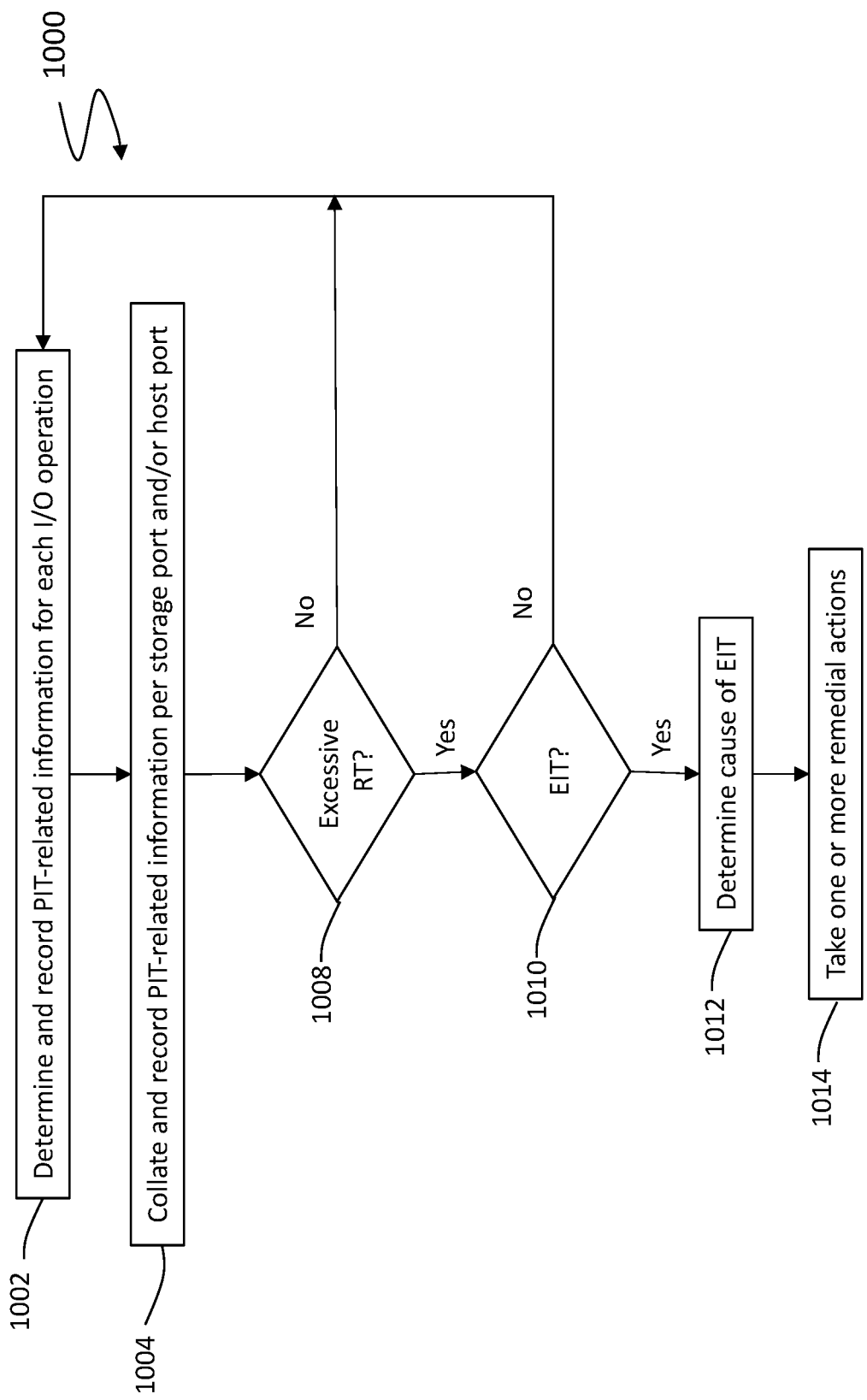
FIG. 10 is a flow chart illustrating an example of a method of determining and addressing excessive idle times of I/O operations on a storage network, according to embodiments of the invention.

FIG. 10 is a flow chart illustrating an example of a method 1000 of determining and addressing excessive idle times of I/O operations on a storage network, according to embodiments of the invention. Other embodiments of a method of determining and addressing excessive idle times of I/O operations on a storage network, for example, variations of method 1000, are possible and are intended to fall within the scope of the invention.

In step 1002, for one or more (e.g., all) storage ports of a storage system (e.g., 740, 742), for one or more (e.g., all) I/O operations using the storage port, PIT-related information ("PIT information") may be determined and recorded. In some embodiments, a PIT may be determined for all I/O operations using a storage port, whereas in some embodiments a PIT may be determined for less than all such I/O operations. For example, a PIT may be determined periodically on a subset of I/O operations for a storage port. The process for determining PITs for different types of I/O operations may be different. For example, determining a PIT for a read operation may be different than determining the PIT of a write operation, as described in more detail elsewhere herein.

Figure 11:
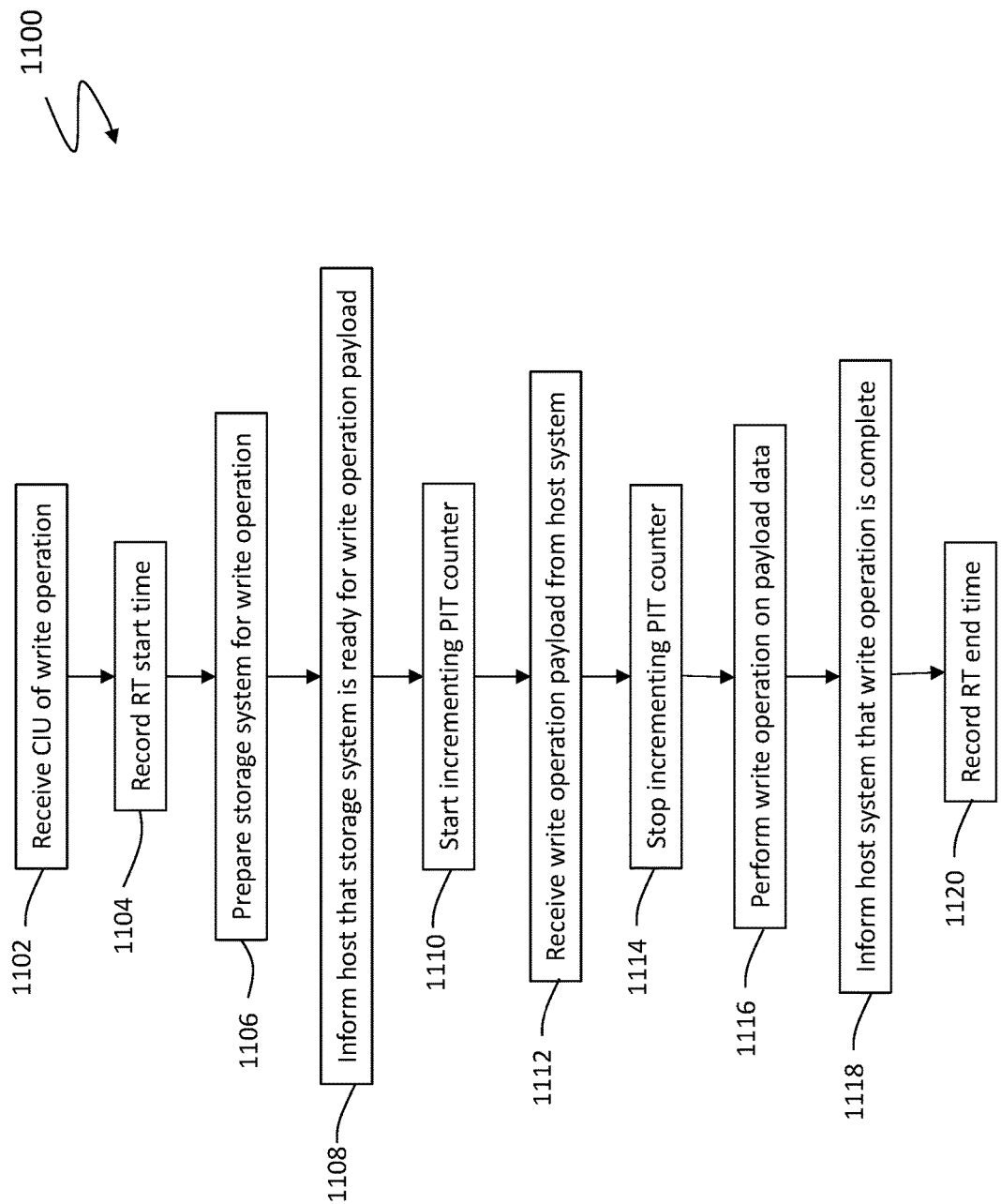
FIG. 11 is a flow chart illustrating an example of a method of determining a payload idle time of a write operation, according to embodiments of the invention.

FIG. 11 is a flow chart illustrating an example of a method 1100 of determining a payload idle time of a write operation, according to embodiments of the invention. Other embodiments of a method of determining a payload idle time of a write operation, for example, variations of method 1100, are possible and are intended to fall within the scope of the invention.

In step 1102, a CIU (e.g., a CDB) of a write operation may be received from a host port, the CIU indicating that a write is to be performed (e.g., specifying a write opcode), and specifying other information, for example, a LUN, a starting logical block address (LBA), size of payload, and other information. In some embodiments, the receipt of the CIU may trigger a start time for determining RT of the write operation in step 1104, and, in step 1106, the storage system may prepare for a the write operation. These preparations may include allocating a portion of a cache on the storage system, for example, in global memory of the storage system shared by directors (which may include FEs and DAs) or in a local memory dedicated to a director handling the I/O operation, to receive the write operation data before de-staging it to a storage device. Other preparations, including those known or later developed, may be made.

When the storage system has completed preparing to receive the write data of the payload of the write operation, in step 1108 the storage system can send an indication to the host port that it is ready to receive the payload data from the host port, after which a PIT counter may start incrementing in step 1110. It may be desirable to start the PIT counter at this point because the storage port is now waiting for the data to be sent from the host port, and any elapsed time until the data is received is outside the control of the storage port. In step 1112, the write operation payload, including data, may be received from the host port, in response to which the PIT counter may be stopped in step 1114, the lapsed time of the PIT counter establishing the PIT of the write operation.

In step 1116, the write operation may be performed, and the host system informed of its completion in step 1118, for example, by the storage port sending a communication to the host port acknowledging that the write operation has been performed. In step 1120, an end time of the RT may be recorded, where the lapsed time between the start time recorded in step 1104 and the end time establishes the RT.

It should be appreciated that, rather than starting and stopping a PIT counter, a PIT start and end time may be recorded, respectively, the difference establishing the PIT of the write operation. Similarly rather than recording a start and end time for RT, and RT counter may be started and stopped, respectively, to establish the RT of the write operation. Further, it should be appreciated that method 1100 may include additional steps, including sub-steps of one or more the steps illustrated and described.

Figure 12:
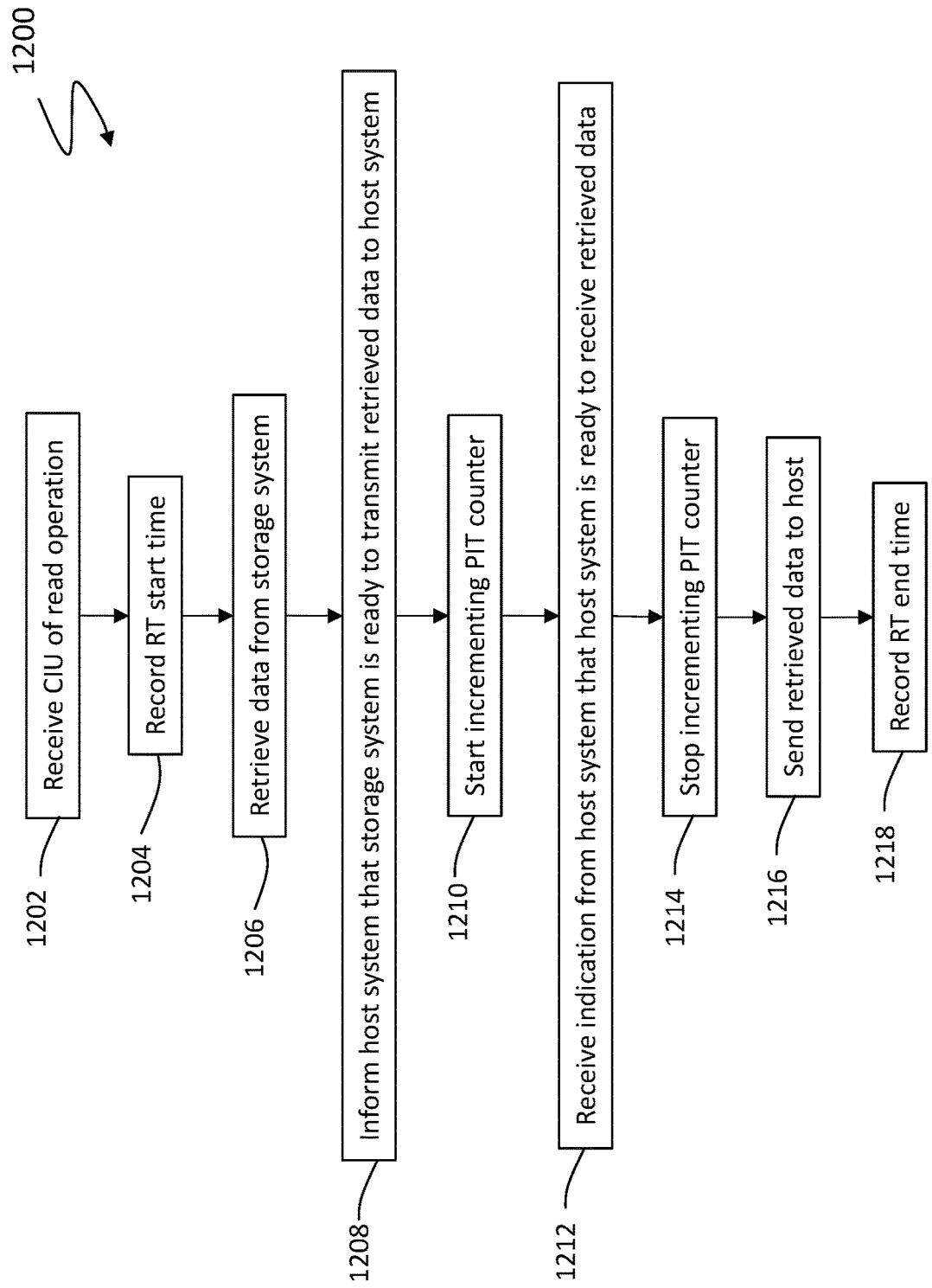
FIG. 12 is a flow chart illustrating an example of a method of determining a payload idle time of a read operation, according to embodiments of the invention.

FIG. 12 is a flow chart illustrating an example of a method 1200 of determining a PIT of a read operation, according to embodiments of the invention. Other embodiments of a method of determining a PIT of a read operation, for example, variations of method 1200, are possible and are intended to fall within the scope of the invention.

In step 1202, a CIU (e.g., a CDB) of a read operation may be received from a host port, the CIU indicating that a read is to be performed (e.g., specifying a read opcode), and specifying other information, for example, a LUN, a starting logical block address (LBA), size of payload, and other information. In some embodiments, the receipt of the CIU may trigger a start time for determining RT of the read operation in step 1204, and, in step 1206, the storage system may retrieve the payload data specified by the read operation from one or more storage devices on the storage system (or from cache if the same data was read relatively recently).

Once the data has been retrieved, the storage system may inform the host system that the storage port is ready to transmit the retrieved data to the host port in step 1208, after which a PIT counter may start incrementing in step 1210. It may be desirable to start the PIT counter at this point because the storage port is now waiting for the host system to indicate (e.g., send an ACK) that is ready to receive the retrieved data, and any elapsed time until the indication is received is outside the control of the storage port. In step 1212, an indication that the host port is ready to receive the retrieved data may be received from the host port, in response to which the PIT counter may be stopped in step 1214, the lapsed time of the PIT counter establishing the PIT of the read operation.

In step 1216, the retrieved data may be sent from the storage port to the host port, and, in step 1218, an end time of the RT may be recorded, the lapsed time between the start time recorded in step 1204 and the end time establishing the RT.

It should be appreciated that, rather than starting and stopping a PIT counter, a PIT start and end time may be recorded, respectively, the difference establishing the PIT of the read operation. Similarly rather than recording a start and end time for RT, an RT counter may be started and stopped, respectively, to establish the RT of the read operation. Further, it should be appreciated that method 1200 may include additional steps, including sub-steps of one or more the steps illustrated and described.

Returning to method 1000, step 1002 may include determining EIT values for each I/O operation based on the determined PIT for the respective I/O operation and a predefined PIT threshold, as described in more detail elsewhere herein. The EIT of an I/O operation may be determined immediately following determination of the PIT of the I/O operation or at a later time, for example, in connection with performance of step 1004. In some embodiments, EITs of individual I/O operations are not determined, but rather an average EIT value is determined based on an average PIT value.

FIG. 13 is a block diagram illustrating an example of a data structure 1300 for recording PIT information for I/O operations, according to embodiments of the invention. Other embodiments of a data structure for recording PIT information for I/O operations, for example, variations of data structure 1300, are possible and are intended to fall within the scope of the invention. While data structure 1300 is illustrated as a table, other types of data structures, for example, one or more linked lists or object-oriented data structures, may be used.

Table 1300 may include a plurality of entries (e.g., rows) 1316, each entry representing an I/O operation. Each entry may specify any of: a transaction ID specifying a transaction ID of the I/O operation in column 1302; an application name (or other ID) of the application for which the I/O operation is being performed in column 1304; a storage device ID (e.g., world-wide name (WWN) of the storage port (e.g., target port) of I/O operation in column 1306; a host port ID (e.g., WWN) of the host port (e.g., initiator port) of the I/O operation in column 1308; a measured RT for the I/O operation in column 1312; a determined PIT for the I/O operation in column 1314; a determined EIT for the I/O operation in column 1315; other information (not shown); or any suitable combination of the foregoing.

An entry may be populated in table 1300 following completion of an I/O operation and any requisite calculations being made. Table 1300 may serve as a master transaction register of PIT information from which indexes and other data structures of various combinations of PIT information may be created, and/or which may be queried to report PIT information in various combinations and formats, as described in more details elsewhere herein.

Returning to FIG. 10, in step 1004, PIT information may be collated and recorded, for example, per storage port and/or host port. Step 1004 may involve accessing information from table 1300 and creating one or more other data structures, for example, data structures 1400 or 1500 described in more detail elsewhere herein. PIT information may include some or all of the PITs determined for one or more storage ports and/or host ports during a certain interval (e.g., over the last minute, hour, day or week, or a multiple thereof). PIT information may include PIT values resulting from averaging PITs for I/O operations over a period of time on a storage port, host port or other component of a storage network. PIT information also may include EIT information determined from any of the foregoing. For example, in some embodiments, one or more average EITs may be determined for one or more respective average PITs. In some embodiments, EITs may be determined for PITs of individual I/O operations in connection with performance of step 1002, and average EIT values determined from these EIT values. Regardless of whether an EIT value is determined from PITs for individual I/O operations or for average PIT values, the EIT value may be determined by comparing the individual or average PIT value, respectively, to a PIT threshold indicative, which may reflect an acceptable PIT, e.g., under normal circumstances without I/O congestion between a storage port and a host port. For example, it may be determined whether an individual PIT value or average PIT value is greater than the PIT threshold. If not greater than the PIT threshold, the individual EIT value or average EIT value, respectively, may be set to 0; i.e., to indicate that there is no excessive payload idle time. If the individual PIT value or average PIT value is greater than the PIT threshold, then the individual EIT value or average EIT value be set equal to the difference between the individual PIT value or average PIT value, respectively, and the PIT threshold. In some embodiments, one or more different storage ports, host ports or other system components may have specific PIT thresholds that may be applied. In some embodiments, a same PIT threshold may be associated with all host ports and/or other components.

The PIT information, including EIT information, may be organized into one or more data structures, including tables and/or indexes, each of which of which may be derived from PIT information in table 1300. For example, one or more tables (e.g., 1400 and/or 1500) may be created for storage ports and/or host ports, in which PIT information specific to a particular storage port or host port, respectively, may be compiled.

FIG. 14 is a block diagram illustrating an example of a data structure 1400 for recording PIT information associated with a host port, according to embodiments of the invention. Other embodiments of a data structure for recording payload idle time information associated with a host port, for example, variations of data structure 1400, are possible and are intended to fall within the scope of the invention. While data structure 1400 is illustrated as a table, other types of data structures, for example, one or more linked lists or object-oriented data structures, may be used.

Host port PIT table 1400 may represent PIT information for a particular host port (e.g., any of 712*a*, 712*b*, 714*a*, 714*b* or 716*a*), and may include a plurality of entries (e.g., rows) 1410. Each of entries 1410 may represent a storage port (e.g., any of 744*a*, 744*b*, 746*a*, 746*b*, 748*a*) in I/O communication with the host port over which one or more I/O operations have been performed, e.g., during the temporal interval over which the PIT information was gathered. Each of entries 1410 may include: a storage port ID in column 1404; an average RT for I/O operations between the host port and storage port in column 1406, an average PIT for I/O operations between the host port and storage port in column 1408; average EIT for I/O operations between the host port and storage port in column 1409; other information (not shown); or any suitable combination of the foregoing.

FIG. 15 is a block diagram illustrating an example of a data structure 1500 for recording payload idle time information for a storage port, according to embodiments of the invention. Other embodiments of a data structure for recording payload idle time information for a storage host port, for example, variations of data structure 1500, are possible and are intended to fall within the scope of the invention. While data structure 1500 is illustrated as a table, other types of data structures, for example, one or more linked lists or object-oriented data structures, may be used.

Storage port PIT table 1500 may represent PIT information for a particular storage port (e.g., any of 741*a*, 744*b*, 746*a*, 746*b*, 748*a*), and may include a plurality of entries (e.g., rows) 1410. Each of entries 1410 may represent a host port (e.g., any of 7712*a*, 712*b*, 714*a*, 714*b* or 716*a*) in I/O communication with the storage port over which one or more I/O operations have been performed, e.g., during the temporal interval over which the PIT information was gathered. Each of entries 1510 may include: a storage port ID in column 1504; an average RT for I/O operations between the host port and storage port in column 1506, an average PIT for I/O operations between the host port and storage port in column 1508; average EIT for I/O operations between the host port and storage port in column 1509; other information (not shown); or any suitable combination of the foregoing.

It should be appreciated that any of a variety of other data structures of PIT information may be created for one or more other entities of a storage network, including any of those described herein.

Returning again to method 1000, step 1004 may be performed at regular intervals (e.g., every minute, hourly, daily or weekly, or a multiple of any of the foregoing, per a schedule), or in response to an event, for example, user input or detection of excessive response time(s). When performed regularly, the frequency and how far back to look at PIT-related information (e.g., last minute, hour, day, week, or multiple thereof), may be defined based on any of a variety of factors, including resource capacity, resource consumption of such performance, and a possible (e.g., estimated) resulting impact on system performance. The recorded PIT information may be conveyed to one or more network components of a storage network. For example, any of data structures 1300, 1400 or 1500, or portions thereof, may be communicated to any components of a storage network (e.g., storage network 700).

In step 1008, it may be determined whether there may been any excessive RTs, for example, during a certain temporal period being assessed. Whether there have been any excessive RTs may be determined, for example, by comparing RTs determined for specific applications, SGs or storage devices to respective RTOs for such applications, SGs or storage devices, respectively. If it is determined in step 1008 that there are one or more excessive RTs, then in step 1010 it may be determined whether there are any EITs associated with the excessive RTs. For example, from data structures (e.g., 724, 754) on a storage system or elsewhere on a storage network, it may be determined that the application for which an excessive RT was determined is configured to perform I/O over a specific host port and storage port, and the PIT information for the storage port and host port (e.g., in tables 1400 and 1500) may be accessed to determine whether there are any EITs.

In some embodiments, step 1010 is performed irrespective of performance of step 1008 or the result such performance. For example, in some embodiments, method 1000 does not include step 1008. In such embodiments, step 1010 may not be limited to consideration of specific storage ports or host ports corresponding to a determined excessive RT, but rather may involve reviewing PIT information (e.g., in tables 1400 and 1500) for more (e.g., all) storage ports and host ports associated with a storage system to determine if there are any EITs over a particular temporal interval.

If it is determined in step 1010 that there are no EITs, or determined in step 1008 that there are no excessive RTs, method 1000 may return to step 1002. If it is determined in step 1010 that there are EITs (e.g., there are determined EIT values >0), then method 1000 may proceed to step 1012.

In step 1012, one or more causes of one or more EITs may be determined. Such a determination may be done manually, automatically, or in some combination thereof. For example, PIT information (e.g., information contained in any of data structures 1300, 1400 or 1500, or other data structures) may be presented to one or more users of a storage network, e.g., as a result of a query being run thereon. Such PIT information may be collated and displayed in various forms. PIT information may be displayed to a user in a manner that assists a user in visually inspecting the PIT information to ascertain a cause of EIT or other issues that the presentation of the information may illuminate. For example, consider the full contents of tables 1400 and 1500 (as illustrated) being visually presented to a user, e.g., a storage system, network or host administrator. A review of table 1400 alone may lead one to the conclusion that the storage port WWN13 (entry 1410*a*) and the storage port WWN37 (entry 1410*c*) are potential causes of EIT. However, review of table 1500 (alone or in combination with table 1400) may lead to the conclusion that host port WWN7 (entry 1510*a*) is the cause of EIT, or is associated with the cause of EIT, as the entries 1510*b*-1510*d* for other host ports do not indicate any EIT, and the EITs of WWN13 and WWN37 may result from I/O operations with WWN7. Further information then may be analyzed to determine what one or more components or aspects thereof associated with WWN7 are the causes of the EIT, for example, any of: the host port itself, a physical link of the host port (e.g., over-utilization thereof), the HBA that includes the host port, another component of the host, one or more other physical links between the host port and a storage port (including those within a switch), the switch itself, the zoning of the switch, other components or aspects, or any suitable combination of the foregoing.

It should be appreciated that various aspects of the analysis performed in step 1012 may be performed automatically. For example, PIT logic 752 may be configured (e.g., programmed) to compare and otherwise analyze PIT information to determine a cause of EIT, or to present possible causes to a user, or to present results of such analysis in a manner that assists a user in determining one or more causes.

In step 1014, one or more remedial actions may be taken based on the determined one or more causes of EIT. Remediations may include, for example, relocating a host application to another host, reconfiguring a host (e.g., using a multi-path driver) and/or switch (e.g., using a zoning table) to use one or more different host ports for one or more applications running on the host; adding more host ports (e.g., adding one or more HBAs) to the host; re-zoning a switch; replacing host ports (e.g., replacing HBAs), switches or switch components with higher-performance replacements; other remediations, or any suitable combination of the foregoing. One or more of such remediations may reduce utilization of an over-utilized host port link.

It should be appreciated that the order of performance of the steps of method 1000 are not limited to the order illustrated in FIG. 10, and that some steps or portions thereof may be performed in parallel with other steps or portions thereof. For example, any of steps 1004-1014 may be performed while step 1002 is determining PIT information for current I/O operations.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including methods 1000, 1100 and 1200, or parts thereof, may be implemented using one or more of the systems and/or data structures described in relation to FIGS. 1-9 and 13-15, or components thereof. Further, various aspects of the invention may be implemented using software, firmware, hardware, a combination of software, firmware and hardware and/or other computer-implemented modules or devices having the described features and performing the described functions.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage network including at least a first host system and at least a first storage system including a plurality of storage ports, the host system including at least a first host port, a method comprising:
for each of the plurality of storage ports, for a respective read operation initiated from the first host port to the storage port, determining a payload idle time during performance of the respective read operation, the payload idle time being an amount of time during which the storage port is waiting for the first host port to be ready to receive data of the respective read operation, wherein determining a first payload idle time for a first respective read operation involving a first of the plurality of storage ports includes:
the first storage port indicating to the first host port that the first storage port is ready to send data in accordance with the first respective read operation to the first host port, and
incrementing a time counter that tracks elapsed time for the first respective read operation until an acknowledgement is received from the first host port that the first host port is ready to receive the data;
determining one or more excessive response times for read operations associated with an application executing on the first host system;
in response to determining the one or more excessive response times, determining, from among the payload idle times, one or more excessive idle times indicative of an excessive time period for a storage port to wait for a host port to be ready to receive data for a respective read operation; and
modifying at least one component of the storage network based on the determined one or more excessive idle times.

2. The method of claim 1, wherein determining a payload idle time for the first respective read operation includes:
receiving a command information unit from the first port indicating that the first respective read operation is a read operation;
the storage system retrieving data from a storage device in accordance with the read operation; and
the first storage port indicating to the first host port that the retrieved data is ready to be sent to the first host port in response to retrieving the data.

3. The method of claim 1, wherein determining one or more excessive idle times includes:
comparing one or more first payload idle times of the payload idle times to a predefined threshold corresponding to an excessive time period for a storage port to wait for a host port to be ready to receive data for a respective read operation.

4. The method of claim 1, further comprising:
determining one or more causes of the one or more excessive idle times, wherein the at least one component of the storage network is modified based at least in part on the determined one or more causes.

5. The method of claim 4, wherein determining one or more causes of the one or more excessive idle times includes comparing, for at least the first host port, payload idle times and/or excessive idle times for two or more of the plurality of storage ports.

6. The method of claim 5, wherein determining one or more causes includes:
determining from the comparing that at least a first storage port of the plurality of storage ports is not a cause of the one or more excessive idle times.

7. For a storage network including at least a first host system and at least a first storage system including a plurality of storage ports, the host system including at least a first host port, a system comprising:
one or more processors; and
memory comprising code stored thereon that, when executed, performs a method comprising:
for each of the plurality of storage ports, for a respective read operation initiated from the first host port to the storage port, determining a payload idle time during performance of the respective read operation, the payload idle time being an amount of time during which the storage port is waiting for the first host port to be ready to receive data of the respective read operation, wherein determining a first payload idle time for a first respective read operation involving a first of the plurality of storage ports includes:
the first storage port indicating to the first host port that the first storage port is ready to send data in accordance with the first respective read operation to the first host port, and
incrementing a time counter that tracks elapsed time for the first respective read operation until an acknowledgement is received from the first host port that the first host port is ready to receive the data;
determining one or more excessive response times for read operations associated with an application executing on the first host system;
in response to determining the one or more excessive response times, determining, from among the payload idle times, one or more excessive idle times indicative of an excessive time period for a storage port to wait for a host port to be ready to receive data for a respective read operation; and
modifying at least one component of the storage network based on the determined one or more excessive idle times.

8. The system of claim 7, wherein determining a payload idle time for the first respective read operation includes:
receiving a command information unit from the first port indicating that the first respective read operation is a read operation;
the storage system retrieving data from a storage device in accordance with the read operation; and
the first storage port indicating to the first host port that the retrieved data is ready to be sent to the first host port in response to retrieving the data.

9. The system of claim 7, wherein determining one or more excessive idle times includes:
comparing one or more first payload idle times of the payload idle times to a predefined threshold corresponding to an excessive time period for a storage port to wait for a host port to be ready to receive data for a respective read operation.

10. The system of claim 7, the method further comprising:
determining one or more causes of the one or more excessive idle times, wherein the at least one component of the storage network is modified based at least in part on the determined one or more causes.

11. The system of claim 10, wherein determining one or more causes of the one or more excessive idle times including comparing, for at least the first host port, payload idle times and/or excessive idle times for two or more of the plurality of storage ports.

12. The system of claim 11, wherein determining one or more causes includes:
determining from the comparing that at least a first storage port of the plurality of storage ports is not a cause of the one or more excessive idle times.

13. One or more non-transitory computer-readable media, the computer-readable media having software stored thereon for a storage network including at least a first host system and at least a first storage system including a plurality of storage ports, the host system including at least a first host port, the software comprising:
executable code that, for each of the plurality of storage ports, for a respective read operation initiated from the first host port to the storage port, determines a payload idle time during performance of the respective read operation, the payload idle time being an amount of time during which the storage port is waiting for the first host port to be ready to receive data of the respective read operation, wherein determining a first payload idle time for a first respective read operation involving a first of the plurality of storage ports includes:
the first storage port indicating to the first host port that the first storage port is ready to send data in accordance with a first respective read operation to the first host port, and
incrementing a time counter that tracks elapsed time for the first respective read operation until an acknowledgement is received from the first host port that the first host port is ready to receive the data; and
executable code that determines one or more excessive response times for read operations associated with an application executing on the first host system;
executable code that determines from among the payload idle times, in response to determining the one or more excessive response times, one or more excessive idle times indicative of an excessive time period for a storage port to wait for a host port to be ready receive data for a respective read operation,
wherein at least one component of the storage network is modified based on the determined one or more excessive idle times.

14. The one or more non-transitory computer-readable media of claim 13, wherein the executable code that determines a payload idle time for the first respective read operation includes:
executable code that receives a command information unit from the first port indicating that the first respective read operation is a read operation;

executable code of the storage system that retrieves data from a storage device in accordance with the read operation; and executable code of the first storage port that indicates to the first host port that the retrieved data is ready to be sent to the first host port in response to retrieving the data.

15. The one or more non-transitory computer-readable media of claim 13, wherein the executable code that determines one or more excessive idle times includes:

executable code that compares one or more first payload idle times of the payload idle times to a predefined threshold corresponding to an excessive time period for a storage port to wait for a host port to be ready to receive data for a respective read operation.

16. The one or more non-transitory computer-readable media of claim 13, the software further comprising:

executable code that determines one or more causes of the one or more excessive idle times, wherein the at least one component of the storage network is modified based at least in part on the determined one or more causes.

17. The one or more non-transitory computer-readable media of claim 16, wherein the executable code that determines one or more causes of the one or more excessive idle times includes executable code that compares, for at least the first host port, payload idle times and/or excessive idle times for two or more of the plurality of storage ports.

* * * * *